United States Patent
Miyahara et al.

(10) Patent No.: US 7,852,500 B2
(45) Date of Patent: Dec. 14, 2010

(54) DETECTING A CURRENT STATE OF AN IMAGE PROCESSING APPARATUS AND SELECTING IMAGE PROCESSING BASED ON THE DETECTED CURRENT STATE

(75) Inventors: Seiji Miyahara, Kanagawa (JP); Satoshi Ouchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1285 days.

(21) Appl. No.: 11/124,276

(22) Filed: May 9, 2005

(65) Prior Publication Data
US 2005/0248801 A1 Nov. 10, 2005

(30) Foreign Application Priority Data
May 7, 2004 (JP) .............................. 2004-138660

(51) Int. Cl.
*G06K 15/00* (2006.01)
(52) U.S. Cl. ..................................... 358/1.14
(58) Field of Classification Search .................. None
See application file for complete search history.

(56) References Cited

U.S. PATENT DOCUMENTS 5,887,216 A * 3/1999 Motoyama ..................... 399/8
6,782,345 B1 * 8/2004 Siegel et al. ................ 702/183
7,533,333 B2 * 5/2009 Motoyama et al. .......... 715/230
2003/0231350 A1 * 12/2003 Yamagishi .................. 358/3.06
2005/0002054 A1 1/2005 Shoji et al.

FOREIGN PATENT DOCUMENTS

JP  08/336055  12/1996
JP  2000/278471  10/2000

OTHER PUBLICATIONS

U.S. Appl. No. 11/333,702, filed Jan. 18, 2006, Shoji et al.
U.S. Appl. No. 10/986,781, filed Nov. 15, 2004, Matsuura et al.
U.S. Appl. No. 11/020,729, filed Dec. 27, 2004, Shoji et al.
U.S. Appl. No. 11/857,132, filed Sep. 18, 2007, Satoh et al.

* cited by examiner

*Primary Examiner*—Edward L. Coles
*Assistant Examiner*—Marcus T Riley
(74) *Attorney, Agent, or Firm*—Oblon, Spivak, McClelland, Maier & Neustadt, L.L.P.

(57) ABSTRACT

An apparatus, method, system, computer program and product, capable of detecting a current state of an image processing apparatus and selecting image processing based on the detected current state are disclosed. The detected current state may be used to determine whether to generate a service call signal.

15 Claims, 11 Drawing Sheets

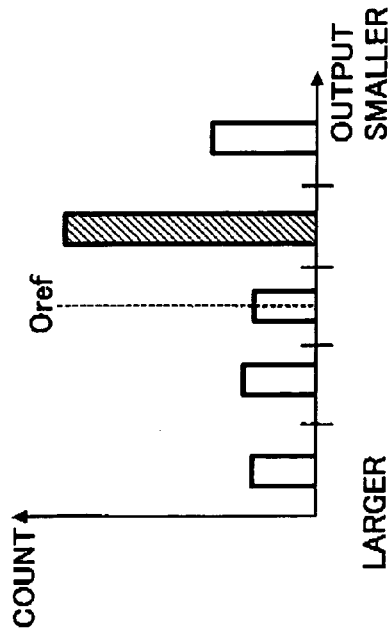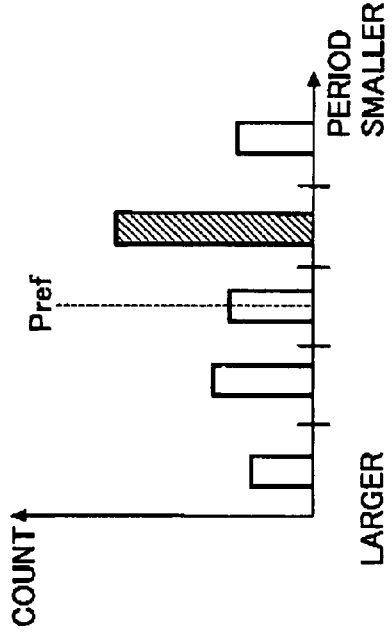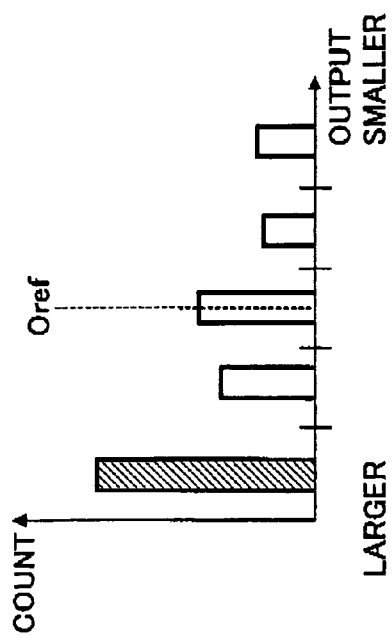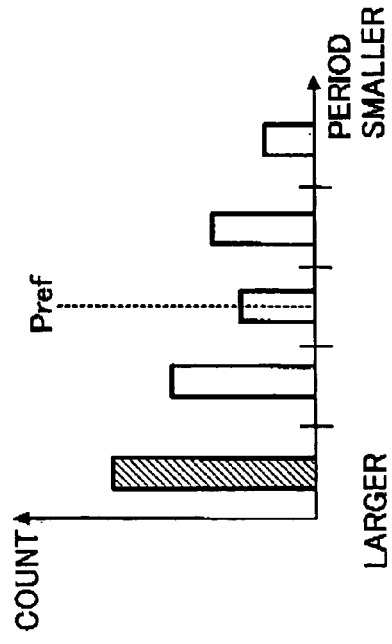

DETECTING A CURRENT STATE OF AN IMAGE PROCESSING APPARATUS AND SELECTING IMAGE PROCESSING BASED ON THE DETECTED CURRENT STATE

CROSS-REFERENCE TO RELATED APPLICATIONS

This patent specification is related and claims priority under 35 U.S.C. §119 to Japanese patent application No. 2004-138660 filed on May 7, 2004, in the Japanese Patent Office, the entire contents of which are hereby incorporated by reference.

FIELD OF THE INVENTION

The following disclosure relates generally to detecting a current state of an image processing apparatus and selecting image processing based on the detected current state.

DESCRIPTION OF THE RELATED ART

Image forming apparatuses, such as copiers, need regular maintenance to continuously produce an image of high quality.

For example, the background image forming apparatus forms a test pattern image to determine whether the apparatus operates in an optimum state. If the apparatus does not operate in the optimum state, the background image forming apparatus performs a calibration operation, by adjusting its image processing or image forming operation.

However, the calibration operation may not be able to fix all the problems, especially when the image forming apparatus operates in an abnormal state. If the apparatus operates in the abnormal state, a user is required to call a service person. Further, the user is prohibited from using the apparatus until it is fixed by the service person.

SUMMARY OF THE INVENTION

Exemplary embodiments of the present invention include an apparatus, method, system, computer program and product, capable of detecting a current state of an image processing apparatus and selecting image processing based on the detected current state.

Other exemplary embodiments of the present invention include an apparatus, method, system, computer program and product, capable of detecting a current state of an image processing apparatus, selecting image processing based on the detected current state, and generating a service call signal based on the detected current state.

In addition to the above-described exemplary embodiments, the present invention may be implemented in many other ways, as will be apparent to those skilled in the art, without departing from the spirit or scope of the appended claims and the following disclosure.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 5A and 5B are histograms illustrating the number of outputs over a specified time period, according to an exemplary embodiment of the present invention;

FIGS. 6A and 6B are histograms illustrating the length of a specified time period, according to an exemplary embodiment of the present invention;

DETAILED DESCRIPTION OF THE PREFERRED EMBODIMENTS

Figure 1:
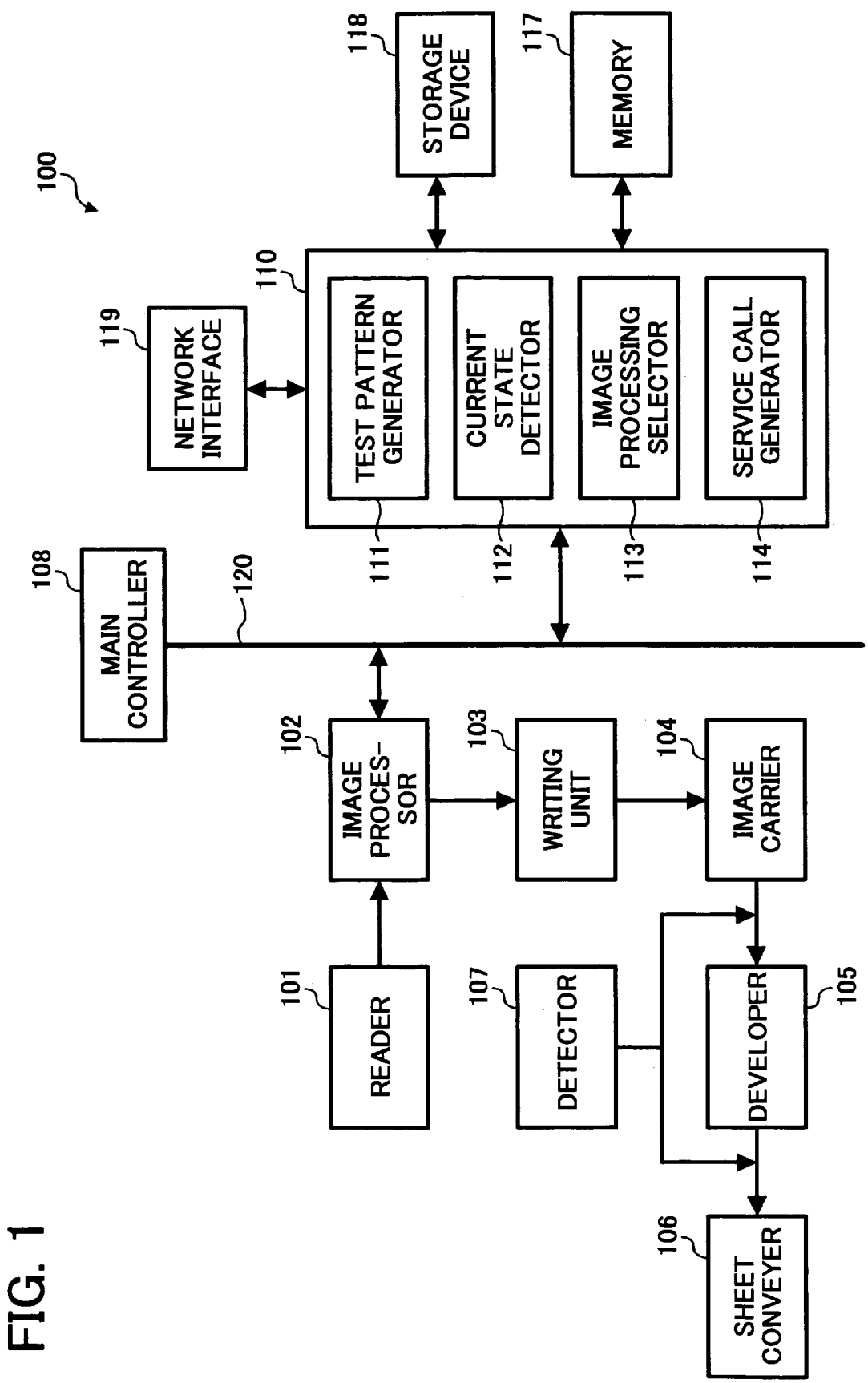
FIG. 1 is a schematic block diagram illustrating an image forming apparatus according to an exemplary embodiment of the present invention.

In describing preferred embodiments illustrated in the drawings, specific terminology is employed for clarity. However, the disclosure of this patent specification is not intended to be limited to the specific terminology selected and it is to be understood that each specific element includes all equivalents that operate in a similar manner. Referring now to the drawings, wherein like reference numerals designate identical or corresponding parts throughout the several views, FIG. 1 illustrates an image forming apparatus 100 according to an exemplary embodiment of the present invention.

The image forming apparatus 100 is capable of selecting image processing or generating a service call signal based on a current state of the apparatus 100.

As shown in FIG. 1, the image forming apparatus 100 includes a reader 101, an image processor 102, a writing unit 103, an image carrier 104, a developer 105, a sheet conveyer 106, a detector 107, a main controller 108, a printer controller 110, a memory 117, a storage device 118, and a network interface 119, which are coupled to one another via a bus 120.

The reader 101 includes any kind of device capable of reading an original document into image data, such as a scanner, for example. The image processor 102 includes any kind of device capable of applying image processing to the image data. The writing unit 103 includes any kind of device capable of forming a latent image based on the image data, such as a laser, for example. The image carrier 104 includes any kind of device capable of carrying the latent image thereon, such as a photoconductive drum, for example. The developer 105 includes any kind of device capable of forming a toner image on a recording medium based on the latent image. The sheet conveyer 106 includes any kind of device capable of conveying the recording medium, such as a sheet feeder, for example. In addition to the above-described devices, the image forming apparatus 100 may include any kind of device, which may be used in an image forming operation, such as a charger or a toner cleaner.

The detector 107 includes any kind of sensor or detector, capable of obtaining current state information, which indicates a current state of the image forming apparatus 100.

The main controller 108 includes any kind of device capable of inputting an instruction from a user, such as an operational panel provided with keys or a display, for example.

The printer controller 110 includes any kind of processor, capable of controlling at least one of devices incorporated in the image forming apparatus 100, according to an instruction input by the user. As shown in FIG. 1, the printer controller 110 includes a test pattern generator 111, a current state detector 112, an image processing selector 113, and a service call generator 114.

The test pattern generator 111 generates a test pattern signal. In this exemplary embodiment, the test pattern generator 111 may select one of a plurality of test patterns stored in the storage device 118. The current state detector 112 is capable of detecting a current state of the image forming apparatus 100. The image processing selector 113 selects image processing based on the detected current state. The service call generator 114 generates a service call signal.

The memory 117 includes any kind of semiconductor memory capable of storing image data, such as a RAM (random access memory), for example. The memory 117 may also function as a working area of the printer controller 110.

The storage device 118 includes any kind of device capable of storing various data, such as image data, history data, or an image processing program, for example. The storage device 118 may be implemented by a ROM (read only memory), or it may be implemented by a HDD (hard disk drive).

The network interface 119 includes any kind of communication device, which connects the image forming apparatus 100 to a network, such as the Internet. In addition to the network interface 119, the image forming apparatus 100 may include a fax controller, which connects the image forming apparatus 100 to a communication line, such as a PSTN (public switched telephone network).

In one exemplary operation, the image forming apparatus 100 operates as a digital copier. Upon receiving an instruction for copying from the main controller 108, the reader 101 reads an original document into image data. The image processor 102 applies scanner image processing to the image data, such as scanner gamma correction, for example. The image data is stored in the memory 117. The image processor 102 reads out the image data from the memory 117, and applies printer image processing to the image data, such as printer gamma correction or halftone processing, for example. Based on the processed image data, the wiring unit 103 forms a latent image on the image carrier 104. The developer 105 develops the latent image into a toner image on a recording medium. The sheet conveyer 106 outputs the recording medium having the toner image.

In another exemplary operation, the image forming apparatus 100 operates as a calibrator. If a user notices abnormality, such as image quality degradation in a printed image, for example, the user may instruct the image forming apparatus 100 to adjust image processing or image forming to improve image quality.

In an exemplary calibration operation, the test pattern generator 111 generates a test pattern signal. The writing unit 103 forms a latent test pattern image on the image carrier 104, according to the test pattern signal. The developer 105 develops the latent test pattern image into a toner test pattern image. The detector 107 obtains current state information from the test pattern image (at least one of the latent test pattern image and the toner test pattern image). The image processing selector 113 selects image processing based on the current state information, preferably by comparing the current state information with optimum state information. The optimum state information indicates an optimum state of the image forming apparatus 100. The selection information indicating the selected image processing is stored in the memory 117.

After the above-described calibration operation, the image processor 102 refers to the selection information stored in the memory 117, and applies the selected image processing to image data received from the reader 101.

If a user still notices abnormality after performing the above-described calibration operation, the user may instruct the image forming apparatus 100 to determine whether the image forming apparatus 100 operates in a normal state or an abnormal state. Alternatively, the instruction for current state detection may be input, without performing the above-described calibration operation.

In an exemplary current state detection operation, the current state information is obtained in a substantially similar manner as described above. The current state detector 112 compares the current state information with normal state information. In this exemplary embodiment, the normal state information, which indicates a normal state of the image forming apparatus 100, is stored in the storage device 118, and it is read by the current state detector 112 at the time of comparison. Based on the comparison result, the current state detector 112 determines whether the image forming apparatus 100 operates in a normal state or an abnormal state.

After the current state detection operation, the image processing selector 113 may perform a calibration operation based on the detected current state. If the apparatus 100 operates in the normal state, the image processing selector 113 selects image processing for the normal state ("normal state image processing"), and stores selection information in the memory 117. If the apparatus 100 operates in the abnormal state, the image processing selector 113 selects image processing for the abnormal state ("abnormal state image processing"), and stores selection information in the memory 117.

The image processor 102 refers to the selection information stored in the memory 117, and applies the selected image processing to image data received from the reader 101.

In another exemplary operation, the image forming apparatus 100 operates as a service call generator. If a user notices abnormality in image processing or image forming, the user may instruct the image forming apparatus 100 to send a service call signal to a specified destination, such as a customer service center, for example.

In an exemplary service call generating operation, the storage device 118 stores history data, which indicates a history of calibration operations performed on the image forming apparatus 100. Based on the history data, the service call generator 114 determines whether to generate a service call signal. Based on the determination result, the service call generator 114 generates a service call signal, and sends it to a specified destination through the network or the communication line, for example.

In another exemplary service call generation operation, the service call generator 114 determines whether to generate a service call signal based on the current state of the image forming apparatus 100. If the apparatus 100 operates in an abnormal state, the service call generator 114 generates a service call signal at the time when a calibration operation is performed. If the apparatus 100 operates in a normal state, the service call generator 114 generates a service call signal based on history data.

Figure 2:
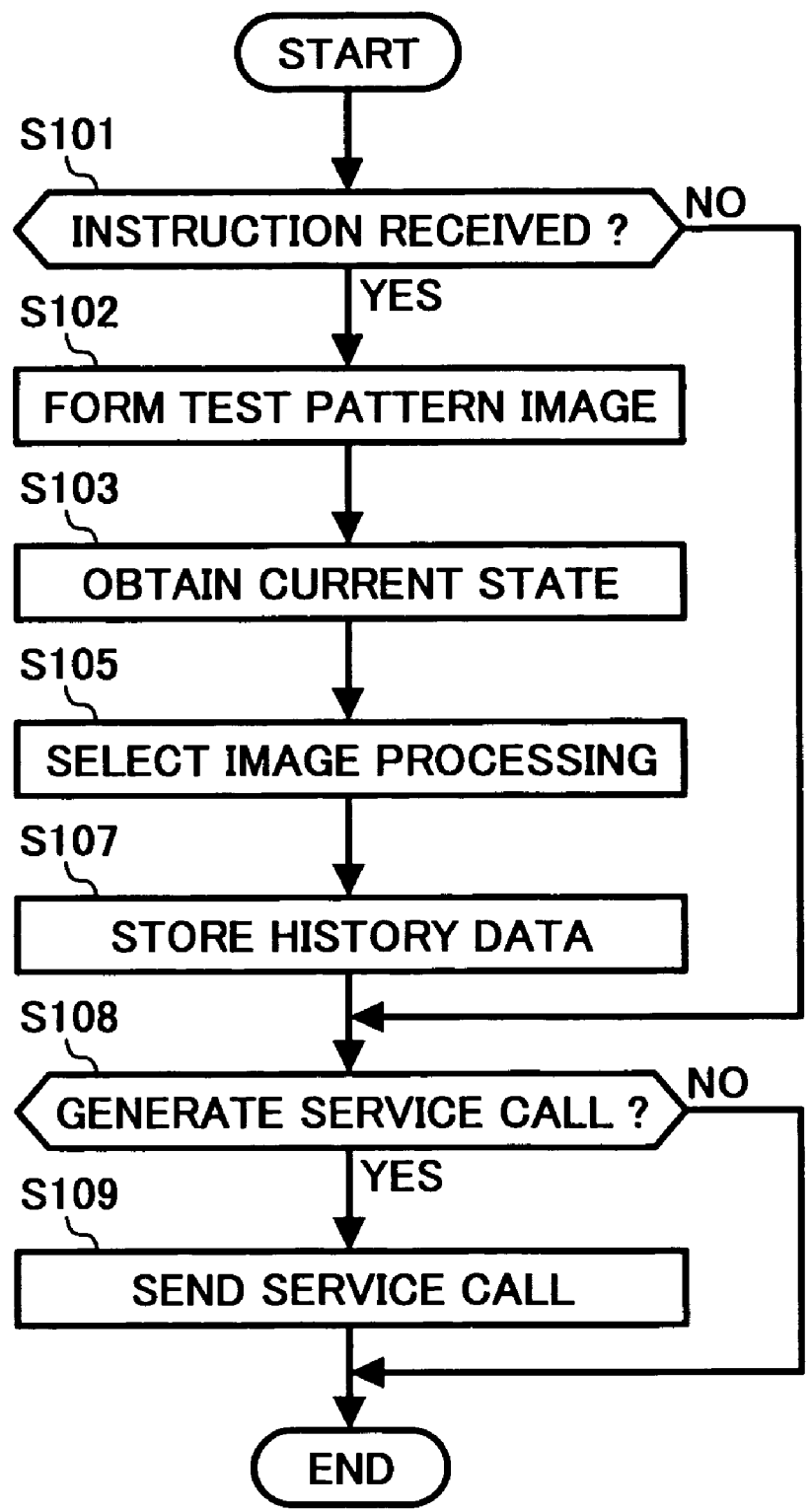
FIG. 2 is a flowchart illustrating an exemplary image processing operation performed by an image forming apparatus of the present invention.

Referring now to FIG. 2, an exemplary operation performed by the image forming apparatus 100 is explained. The steps shown in FIG. 2 are performed, when a user notices image quality degradation in a toner image output from the image forming apparatus 100.

Step S101 determines whether an instruction for calibration is input by the user through the main controller 108. If the instruction is input, the operation proceeds to Step S102. Otherwise, the process ends.

Figure 3:
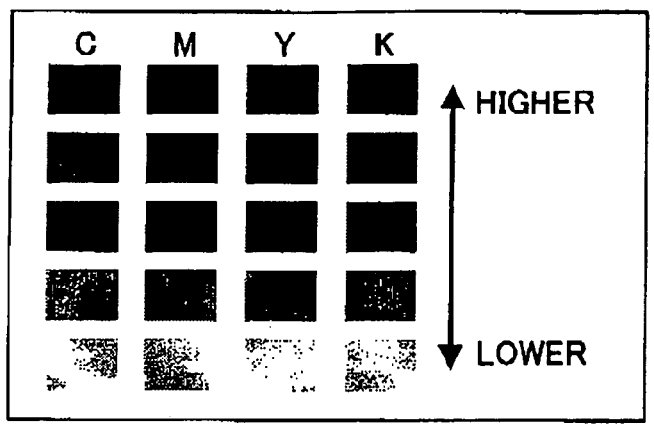
FIG. 3 is an exemplary test pattern image according to the present invention.

Step S102 forms a latent test pattern image on the image carrier 104, and then forms a toner test pattern image on a recording medium. FIG. 3 illustrates an exemplary test pattern image, having a plurality of test patches ranging from lower to higher halftone levels for each of colors, cyan, magenta, yellow, and black. Alternatively, Step S102 may form a test pattern image, having a plurality of test patches for a black color.

Step S103 obtains current state information from the image forming apparatus 100. In this exemplary embodiment, the detector 107 obtains information indicating physical characteristics of the test pattern image. Alternatively, the detector 107 may obtain information indicating the image quality of the test pattern image.

In one example, the detector 107 may be implemented by an image density detector and an image characteristic calculator disclosed in the U.S. patent application Publication No. 2003/0231350 ("'350 patent publication"), published on Dec. 18, 2003, the entire contents of which are hereby incorporated by reference. The detector 107 measures density of the test patches in the test pattern image, and generates density distribution data. Based on the density distribution data, the detector 107 calculates values of main-scanning banding and sub-scanning banding, as current state information. Alternatively, the detector 107 may calculate a graininess value, as current state information.

In another example, the detector 107 may be implemented by at least one of sensors, such as an optical sensor, pressure sensor, or current sensor, disclosed in the U.S. patent application Ser. No. 11/020729 ("'729 patent application") filed on Dec. 27, 2004, or the U.S. patent application Ser. No. 10/986781 ("'781 patent application") filed on Nov. 15, 2004, the entire contents of which are hereby incorporated by reference. The detector 107 may obtain information indicating physical characteristics of the test pattern image, such as its image density, color information (such as color combination or color unevenness), image gradation, etc. Further, the detector 107 may obtain information indicating image quality of the test pattern image, such as definition, graininess, registration skew, mis-color registration, density unevenness, glossiness, image deletion, image fading, etc.

Step S105 selects image processing using the current state information obtained in Step S103, and stores information regarding the selected image processing in the memory 117.

For example, as disclosed in the '350 patent publication, a halftone process may be selected from a plurality of halftone processes, which is stored in the storage device 118, based on the banding values obtained in Step S103.

Alternatively, the current state information may be compared with optimum state information, which is stored in the storage device 118. This comparison result is then used to select image processing.

Step S107 updates history data stored in the storage device 118. In this exemplary embodiment, the history data includes any kind of information indicating a history of calibration operations performed on the image forming apparatus 100. For example, the history data may include the date and time of each of the calibration operations, the number of the calibration operations performed over a specified time period, the number of outputs produced over a specified time period, the current state information obtained for each of the calibration operations, the comparison result obtained for each of the calibration operations, and/or the selected image processing for each of the calibration operations.

Step S108 determines whether to generate a service call signal based on the history data. If it is determined that a service call signal is to be generated, the process proceeds to Step S109. Otherwise, the process ends without generating a service call signal.

Figure 4A:
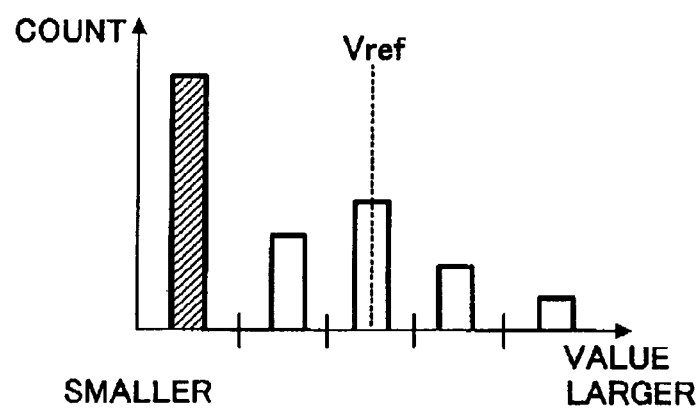
FIGS. 4A and 4B are histograms illustrating the distribution of current state information values, according to an exemplary embodiment of the present invention.
Figure 4B:
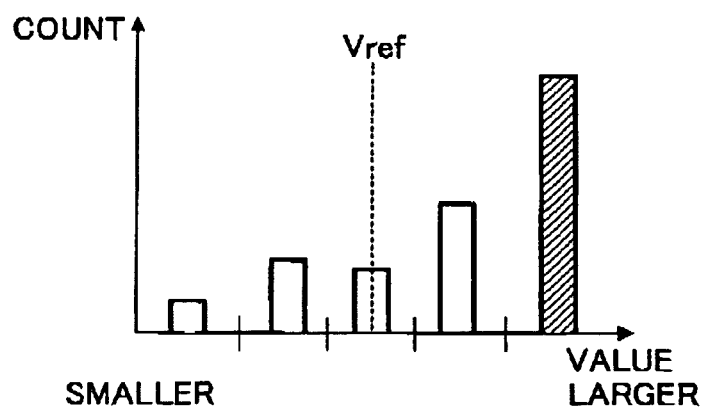

In one example, determination may be made based on the distribution of the current state information values ("information value distribution") over a specified time period. As illustrated in FIG. 4A, the service call generator 114 may determine not to generate a service call signal, if the peak ("hatched" area) in the information value distribution is smaller than a reference information value Vref. Similarly, as illustrated in FIG. 4B, the service call generator 114 may determine to generate a service call signal, if the peak ("hatched" area) in the information value distribution is larger than the reference information value Vref. The reference information value Vref may be set based on various parameters, including a user's preference on image quality.

In the above-described example, instead of using the current state information value, the comparison value, indicating a difference between the current state information value and the optimum state information value, may be used.

In another example, determination may be made based on the number of outputs produced over a specified time period. In this exemplary embodiment, the specified time period represents a time period between the time when the preceding calibration operation is performed and the time when the following calibration operation is performed.

As illustrated in FIG. 5A, the service call generator 114 may determine not to generate a service call signal, if the peak ("hatched" area) in the output value distribution is larger than a reference output value Oref. Similarly, as illustrated in FIG. 5B, the service call generator 114 may determine to generate a service call signal, if the peak ("hatched" area) in the output value distribution is smaller than the reference output value Oref. The reference output value Oref may be set based on various parameters, including a user's preference on image quality.

In another example, determination may be made based on the length of the time period between the time when the preceding calibration operation is performed and the time when the following calibration operation is performed. The length of the time period may be expressed in any time unit, such as hour, date, or week, for example.

As illustrated in FIG. 6A, the service call generator 114 may determine not to generate a service call signal, if the peak ("hatched" area) in the time period value distribution is larger than a reference time period value Pref. Similarly, as illustrated in FIG. 6B, the service call generator 114 may determine to generate a service call signal, if the peak ("hatched" area) in the time period value distribution is smaller than the reference time period value Pref. The reference time period value Pref may be set based on various parameters, including a user's preference on image quality.

In yet another example, the service call generator 114 may determine to generate a service call signal, upon an instruction from the user through the main controller 108.

Step S109 sends a service call signal to a specified destination, and the process ends. In addition to the service call signal, information that may be useful to the calibration operation, such as the current state information or the comparison value, may be sent.

Figure 7:
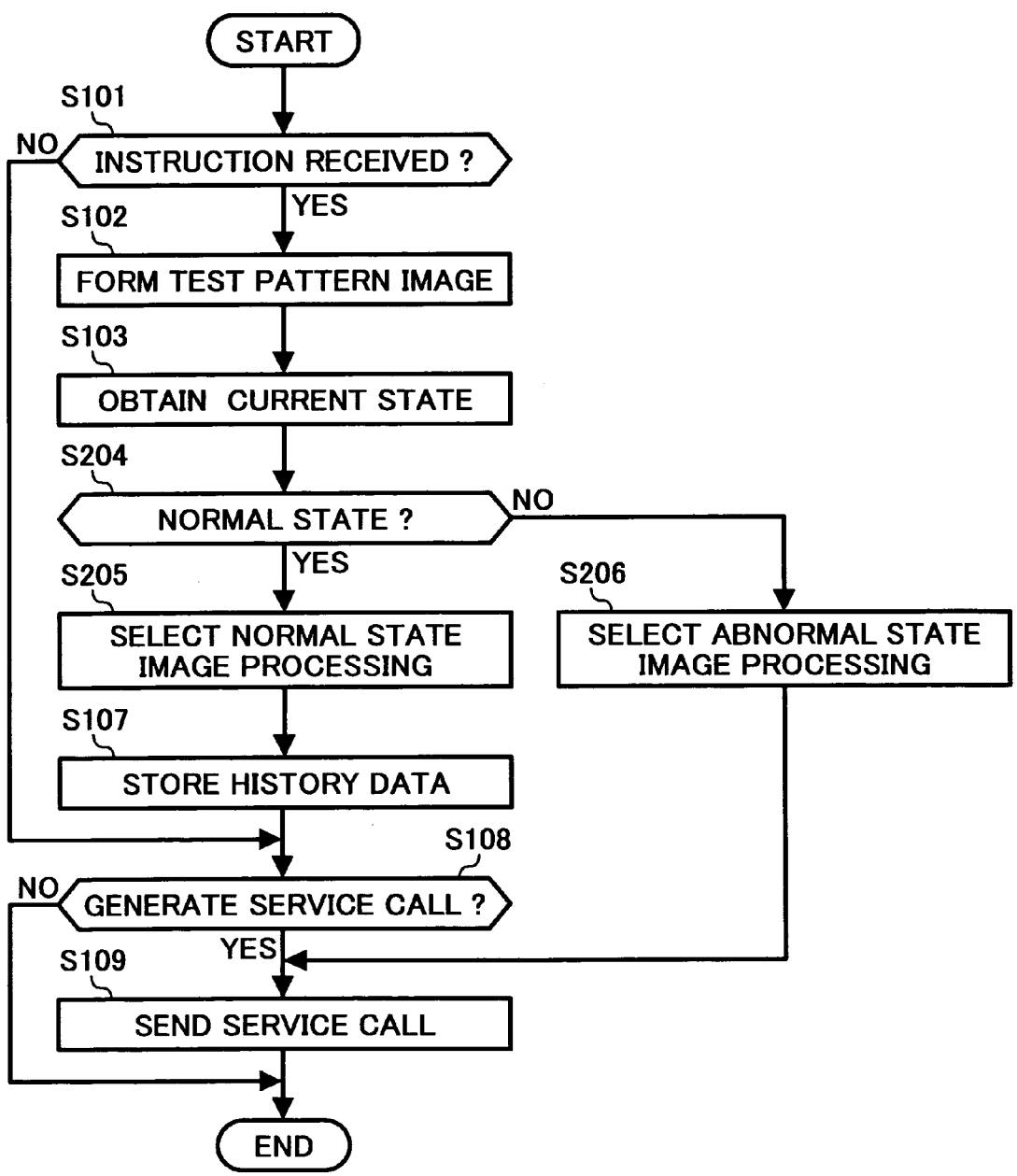
FIG. 7 is a flowchart illustrating an exemplary image processing operation performed by an image forming apparatus of the present invention.

Referring now to FIG. 7, another exemplary operation performed by the image forming apparatus 100 is explained. The steps shown in FIG. 7 are performed, when a user notices image quality degradation in a toner image output from the image forming apparatus 100.

Step S101 determines whether an instruction for calibration is input by the user through the main controller 108. If the instruction is input, the process proceeds to Step S102. Otherwise, the process ends.

Step S102 forms a test pattern image. The test pattern image may be a latent test pattern image formed on the image carrier 104, or a toner test pattern image formed on a recording medium.

Step S103 obtains current state information from the image forming apparatus 100. In this exemplary embodiment, the detector 107 obtains current state information from the test pattern image, such as information indicating physical characteristics of the test pattern image, for example.

Step S204 determines whether the image forming apparatus 100 operates in a normal state or an abnormal state, by comparing the current state information with normal state information. If the image forming apparatus 100 operates in a normal state, the operation proceeds to Step S205. If the image forming apparatus 100 operates in an abnormal state, the operation proceeds to Step S206.

For example, the current state detector 112 compares a current graininess value, which has been obtained from the test pattern image as current state information, with a normal state graininess value, which has been stored as normal state information. If the current graininess value falls inside of a range set based on the normal state graininess value, the current state detector 112 determines that the image forming apparatus 100 operates in a normal state. If the current graininess value falls outside of that range, the current state detector 112 determines that the image forming apparatus 100 operates in an abnormal state.

In this exemplary embodiment, the normal state information may be determined based on the optimum state information. In one example, a normal state value may be set to be 30% larger or smaller than the corresponding optimum value. In another example, a normal state value may be set to be substantially equal to the corresponding optimum state value.

In another example, the current state detector 112 may determine whether the image forming apparatus 100 operates in a normal state or an abnormal state, using the MTS (Mahalanobis Taguchi System) method, as disclosed in the '729 patent application or the '781 patent application.

Step S205 selects normal state image processing. For example, as described above referring to Step S105 of FIG. 2, the image processing selector 113 selects one image processing operation, from a plurality of image processing operations stored in the storage device 118, based on the current state information. Alternatively, the image processing selector 113 may select normal state image processing, based on the comparison value indicating a difference between the current state information and the optimum state information. Further, the image processing selector 113 may select normal state image processing, based on the comparison value indicating a difference between the current state information and the normal state information.

Step S107 updates history data, by adding information regarding the selected normal state image processing.

Step S108 determines whether to generate a service call signal based on the history data, in a substantially similar manner as described referring to FIG. 2. If it is determined to generate a service call signal, the process proceeds to Step S109 to send a service call signal. Otherwise, the process ends without generating a service call signal.

Step S206 selects abnormal state image processing.

Figure 8:
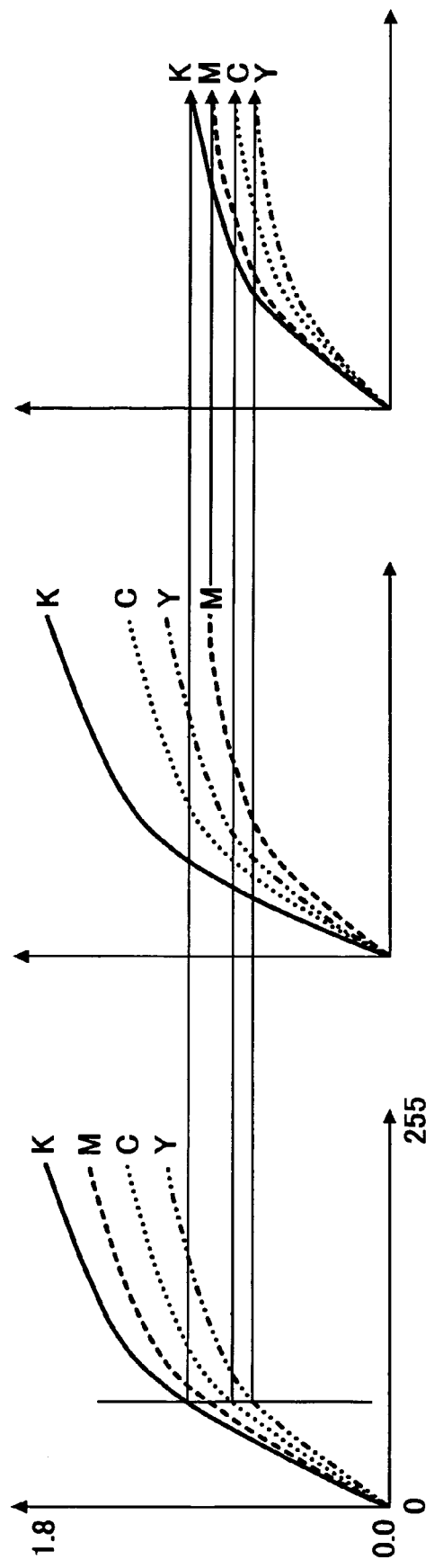
FIG. 8A is a graph illustrating exemplary tone curves according to the present invention obtained in a normal state.
FIG. 8B is a graph illustrating exemplary tone curves according to the present invention obtained in an abnormal state.
FIG. 8C is a graph illustrating exemplary tone curves according to the present invention after abnormal state image processing is applied.

In one example, abnormal state image processing may be applied to maintain the color balance in the image. FIG. 8A illustrates a tone curve for each of color channels obtained when the image forming apparatus 100 is in a normal state. FIG. 8B illustrates a tone curve for each of color channels obtained when the image forming apparatus 100 is in an abnormal state. As shown in FIGS. 8A and 8B, the overall intensity of the magenta color shown in the abnormal state becomes lower than the overall intensity of the magenta color in the normal state.

To maintain the color balance, the tone curve for magenta is used as a reference, and the tone curves of other colors are adjusted to match with the reference magenta curve. For example, as shown in FIG. 8B, the maximum intensity value Imax of the magenta tone curve in the abnormal state is extracted. The intensity value of the black tone curve in the normal state, which corresponds to the maximum intensity value Imax, is extracted, as shown in FIG. 8A. Similarly, the intensity value of the cyan tone curve corresponding to the maximum intensity value Imax, and the intensity value of the yellow tone curve corresponding to the maximum intensity value Imax, are extracted respectively. The extracted intensity values for each of the black, cyan, and yellow tone curves are set as the maximum intensity values for each of the tone curves, as shown in FIG. 8C.

In this exemplary embodiment, information regarding the selected abnormal state image processing is not stored as history data. The selection information is sent to the service call generator 114. Upon receiving the selection information, in Step S109, the service call generator 114 generates a service call signal to a specified destination.

Figure 9:
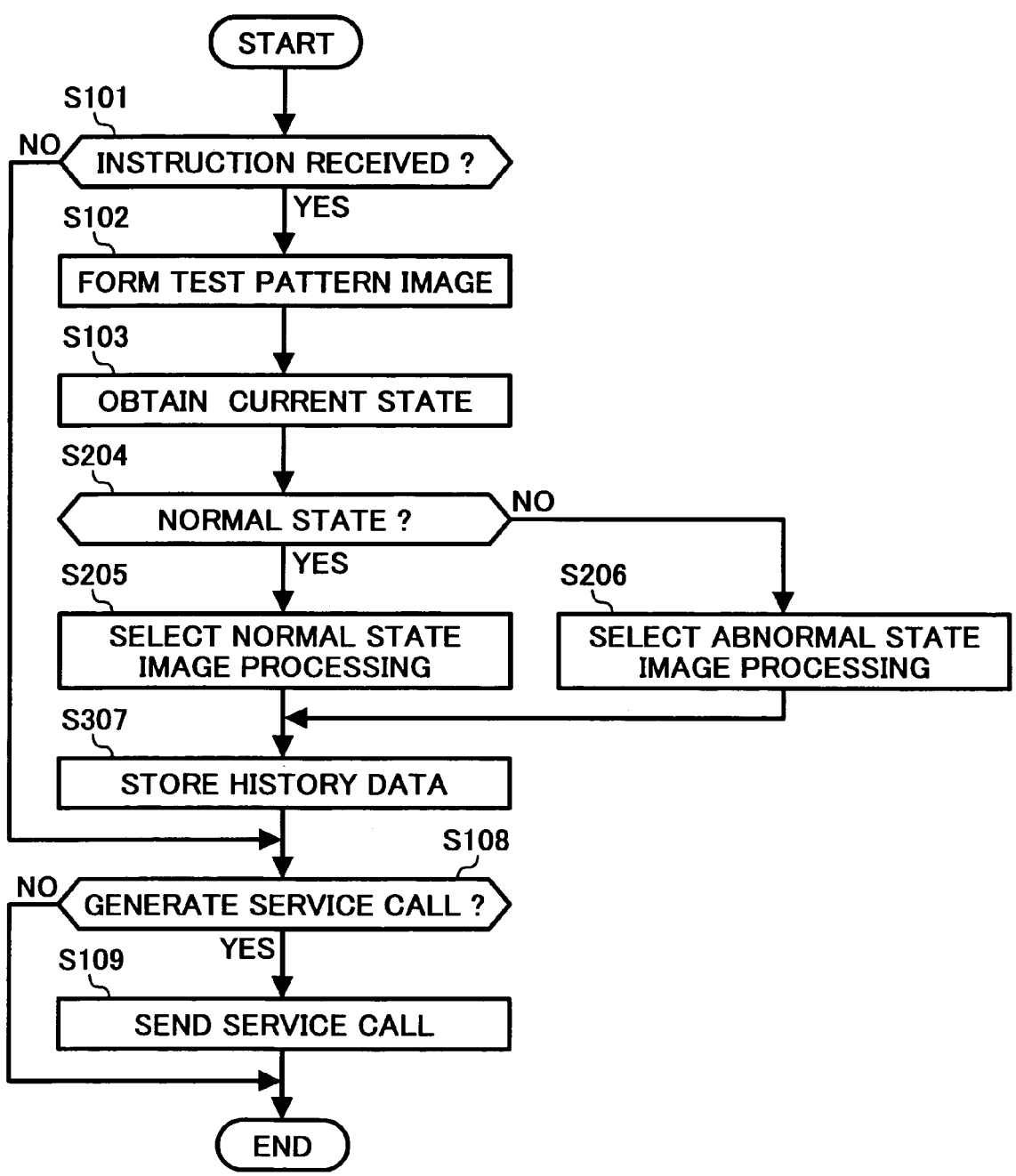
FIG. 9 is a flowchart illustrating an exemplary image processing operation performed by an image forming apparatus of the present invention.

Referring now to FIG. 9, another exemplary operation performed by the image forming apparatus 100 is explained. The operation of FIG. 9 is substantially similar to the operation of FIG. 7. The differences include the Step S307, which additionally stores information, which indicates a history of abnormal state calibration operations performed on the image forming apparatus 100, as history data.

In this exemplary embodiment, the abnormal state calibration operation corresponds to abnormal state image processing performed when the image forming apparatus 100 is in an abnormal state. The normal state calibration operation corresponds to normal state image processing performed when the image forming apparatus 100 is in an abnormal state.

In this exemplary embodiment, the history data includes any kind of information indicating a history of normal state calibration operations performed on the image forming apparatus 100, such as the date and time of each of the normal state calibration operations, the number of the normal state calibration operations performed over specified time period, the current state information obtained for each of the normal state calibration operations, the comparison result or value information obtained for each of the normal state calibration operations, the selected normal state image processing for each of the normal state calibration operations, etc.

In addition, the history data includes any kind of information indicating a history of abnormal state calibration operations performed on the image forming apparatus 100, such as the date and time of each of the abnormal state calibration operations, the number of the abnormal state calibration operations performed over specified time period, the current state information obtained for each of the abnormal state calibration operations, the comparison value or result information obtained for each of the abnormal state calibration operations, the selected abnormal state image processing for each of the abnormal state calibration operations, etc.

Using at least one of the information stored as the history data, in Step SI 09, the service call generator 114 determines whether to generate a service call signal.

In the exemplary image processing operation shown in any one of FIGS. 2, 7, and 9, current state information is obtained from a test pattern image generated in Step S102. However, the detector 107 may obtain any kind of current state information other than the information obtained from the test pattern image, as illustrated in FIG. 10.

Figure 10:
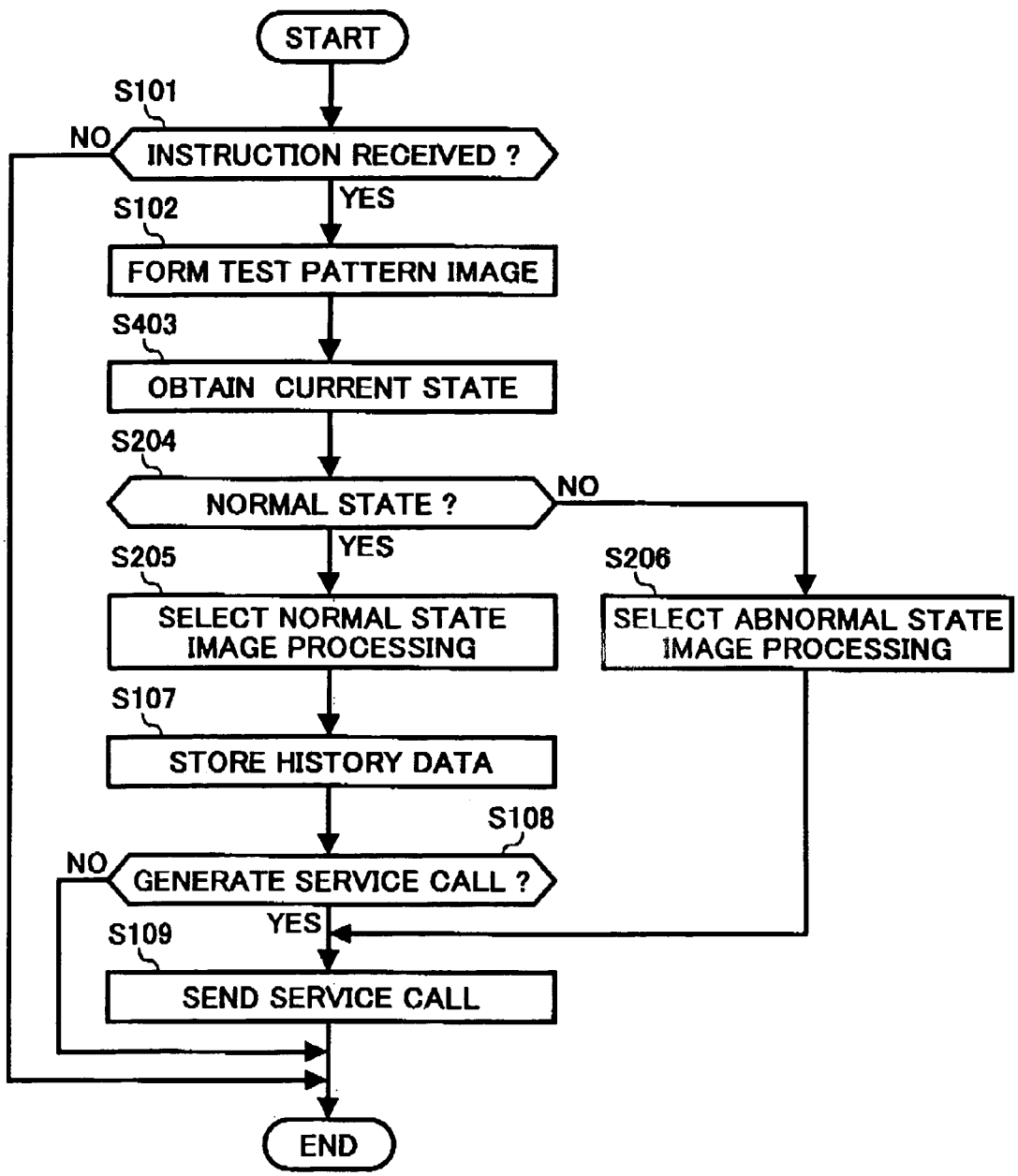
FIG. 10 is a flowchart illustrating an exemplary image processing operation performed by an image forming apparatus of the present invention.

The steps shown in FIG. 10 are substantially similar to the steps shown in FIG. 7. The differences include Step S403, which obtains current state information, other than the information obtained from the test pattern image.

For example, the detector 107 obtains information indicating a current state of the image forming apparatus 100, such as the sensing information disclosed in the '729 patent application or '781 patent application.

Further, the exemplary image processing operation shown in any one of FIGS. 2, 7, and 9 is performed when a user notices image quality degradation in a toner image output from the image forming apparatus 100. However, a user may input an instruction for calibration to the image forming apparatus 100 when any kind of abnormality is detected, such as paperjam, for example.

Figure 11:
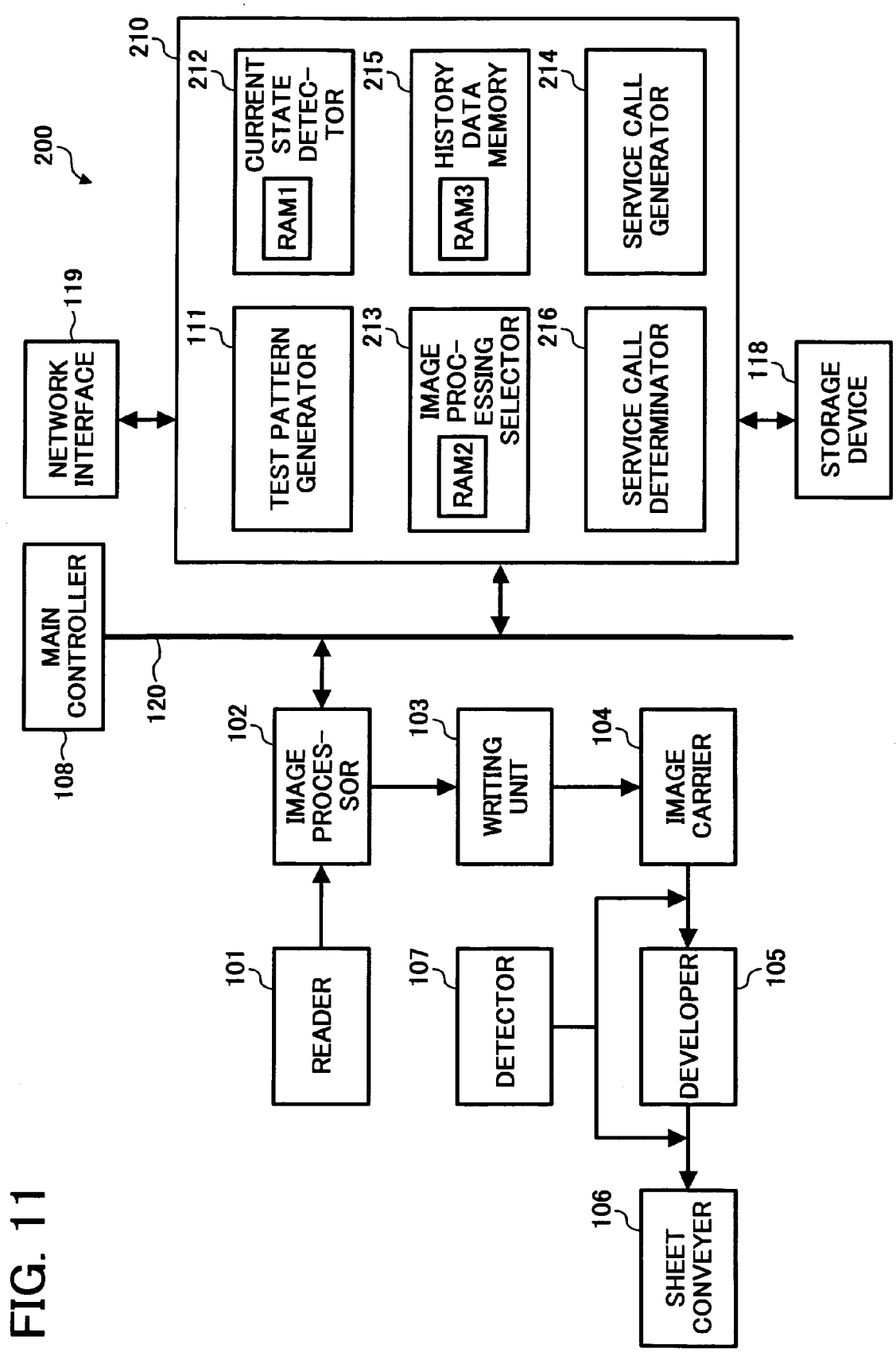
FIG. 11 is a schematic block diagram illustrating an image forming apparatus according to an exemplary embodiment of the present invention.

FIG. 11 illustrates an image forming apparatus 200 according to another exemplary embodiment of the present invention. The image forming apparatus 200 of FIG. 11 is substantially similar in structure to the image forming apparatus 100 of FIG. 1. The differences include the replacement of the printer controller 110 with the printer controller 210, and the deletion of the memory 117.

As shown in FIG. 11, the printer controller 210 includes the test pattern generator 111, a current state detector 212 including a RAM 1, an image processing selector 213 including a RAM 2, a history data memory 215 including a RAM 3, a service call determinator 216, and a service call generator 214.

The current state detector 212 is capable of detecting whether the image forming apparatus 100 operates in a normal state. In this exemplary embodiment, the current state detector 212 obtains current state information from the detector 107, and compares it with normal state information stored in the RAM 1. The current state detector 212 sends the comparison result to the image processing selector 213, and to the history data memory 215.

The image processing selector 213 selects image processing based on the comparison result obtained by the current state detector 212. The selected image processing is stored in the RAM 2, to be read out by the image processor 102.

The history data memory 215 stores the comparison result in the RAM 3 as history data. The history data may additionally include the date and time of each of the calibration operations performed on the image forming apparatus 200, for example.

The service call determinator 216 determines whether to generate a service call signal based on the history data.

The service call generator 214 sends a service call signal when the service call determinator 216 determines to generate a service call.

Referring back to FIG. 2, an exemplary image processing operation performed by the image forming apparatus 200 is explained. The steps shown in FIG. 2 are performed, when a user notices image quality degradation in a toner image output from the image forming apparatus 200.

Step S101 determines whether an instruction for calibration is input by the user through the main controller 108. If the instruction is input, the process proceeds to Step S102. Otherwise, the process ends.

Step S102 forms a test pattern image. The test pattern image may be a latent test pattern image formed on the image carrier 104, or a toner test pattern image formed on a recording medium.

Step S103 obtains current state information from the image forming apparatus 200. In this exemplary embodiment, the detector 107 obtains current state information, such as information indicating physical characteristics of the test pattern image, and sends it to the current state detector 112.

Step S105 selects image processing using the current state information. In this exemplary embodiment, the current state detector 112 extracts optimum state information, which corresponds to the current state information. The current state detector 112 compares the current state information with the optimum state information, and stores the comparison result in the RAM 1. Using the comparison result, the image processing selector 113 selects image processing, and stores information regarding the selected image processing in the RAM 2.

Step S107 updates history data stored in the RAM 3. For example, the history data memory 215 stores the comparison result in the RAM 3.

Step S108 determines whether to generate a service call signal based on the history data, in a substantially similar manner as described above referring to FIG. 2. In this exemplary embodiment, determination is made by the service call determinator 216. If it is determined that a service call signal is to be generated, the process proceeds to Step S109. Otherwise, the process ends without generating a service call signal.

Step S109 sends a service call signal to a specified destination, and the process ends.

Referring back to FIG. 7, another exemplary operation performed by the image forming apparatus 200 is explained. The steps shown in FIG. 7 are performed, when a user notices image quality degradation in a toner image output from the image forming apparatus 200.

Step S101 determines whether an instruction for calibration is input by the user through the main controller 108. If the instruction is input, the process proceeds to Step S102. Otherwise, the process ends.

Step S102 forms a test pattern image. The test pattern image may be a latent test pattern image formed on the image carrier 104, or a toner test pattern image formed on a recording medium.

Step S103 obtains current state information from the image forming apparatus 200. In this exemplary embodiment, the detector 107 obtains current state information from the test pattern image, and sends it to the current state detector 112.

Step S204 determines whether the image forming apparatus 200 operates in a normal state or an abnormal state. In this exemplary embodiment, the current state detector 112 extracts normal state information corresponding to the current state information, and compares the current state information with the normal state information. The comparison result is stored in the RAM 1. If the comparison result indicates that the difference between the current state information and the normal state information is larger or smaller than a predetermined value, the current state detector 112 determines that the image forming apparatus 200 operates in an abnormal state, and the process proceeds to Step S206. Otherwise, the process proceeds to Step S205.

Step S205 selects normal state image processing. For example, a tone curve for at least one of the colors, cyan, magenta, yellow, and black, may be adjusted to maintain the color balance in the image. Selection information regarding the selected image processing is stored in the RAM 2.

Step S107 updates history data stored in the RAM 3, by adding the selection information.

Step S108 determines whether to generate a service call signal based on the history data. If it is determined to generate a service call signal, the process proceeds to Step S 109 to send a service call signal. Otherwise, the process ends without generating a service call signal.

Step S206 selects abnormal state image processing, and stores selection information indicating the selected image processing in the RAM 2.

For example, the tone curve for each of the colors may be adjusted, as described above referring to FIGS. 8A to 8C. In this exemplary embodiment, information regarding the tone curves of FIG. 8A and the tone curves of FIG. 8B is stored in the RAM 1, as the comparison result. Information regarding the adjusted tone curves of FIG. 8C is stored in the RAM 2, as the selection information. Using the adjusted tone curves of FIG. 8C, the image processor 102 applies image processing to image data.

In another example, a halftone method may be changed to improve the graininess in the toner image. Examples of halftone methods include ordered dithering, screening, error diffusion, blue-noise dithering, direct binary search, etc.

In this exemplary embodiment, information regarding the selected abnormal state image processing is not stored as history data. The selection information is sent to the service call generator 214. Upon receiving the selection information, in Step S109, the service call generator 214 generates a service call signal to a specified destination.

Figure 12:
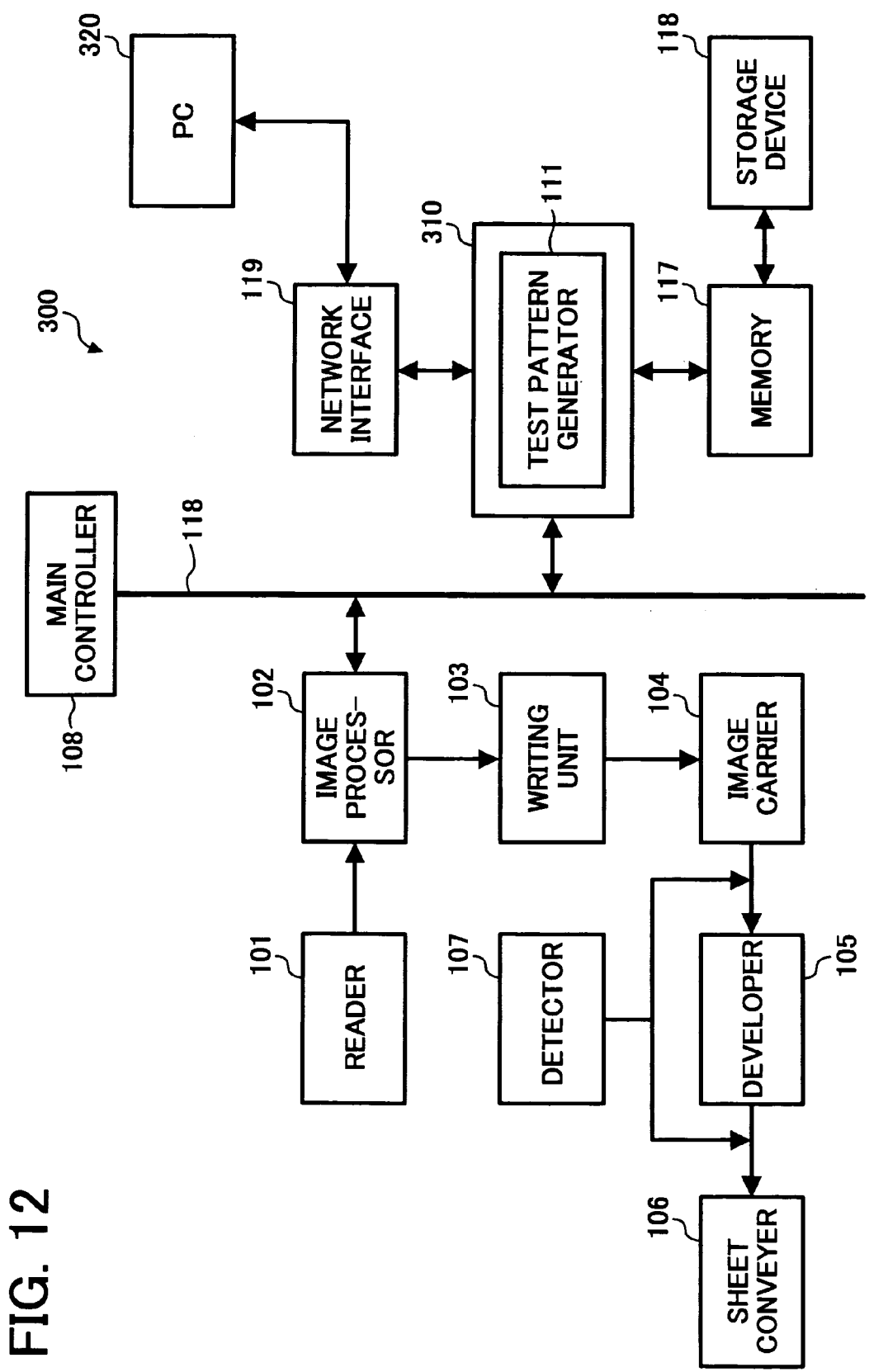
FIG. 12 is a schematic block diagram illustrating an image forming system according to an exemplary embodiment of the present invention.

FIG. 12 illustrates an image forming system, including an image forming apparatus 300 and a PC (personal computer) 320, according to an exemplary embodiment of the present invention. The image forming apparatus 300 is substantially similar in structure to the image forming apparatus 100, except for the printer controller 310. Further, the image forming apparatus 300 is connected to the PC 320 via a network, such as the Internet.

As shown in FIG. 12, the printer controller 310 includes the test pattern generator 111, which generates a test pattern signal.

Figure 13:
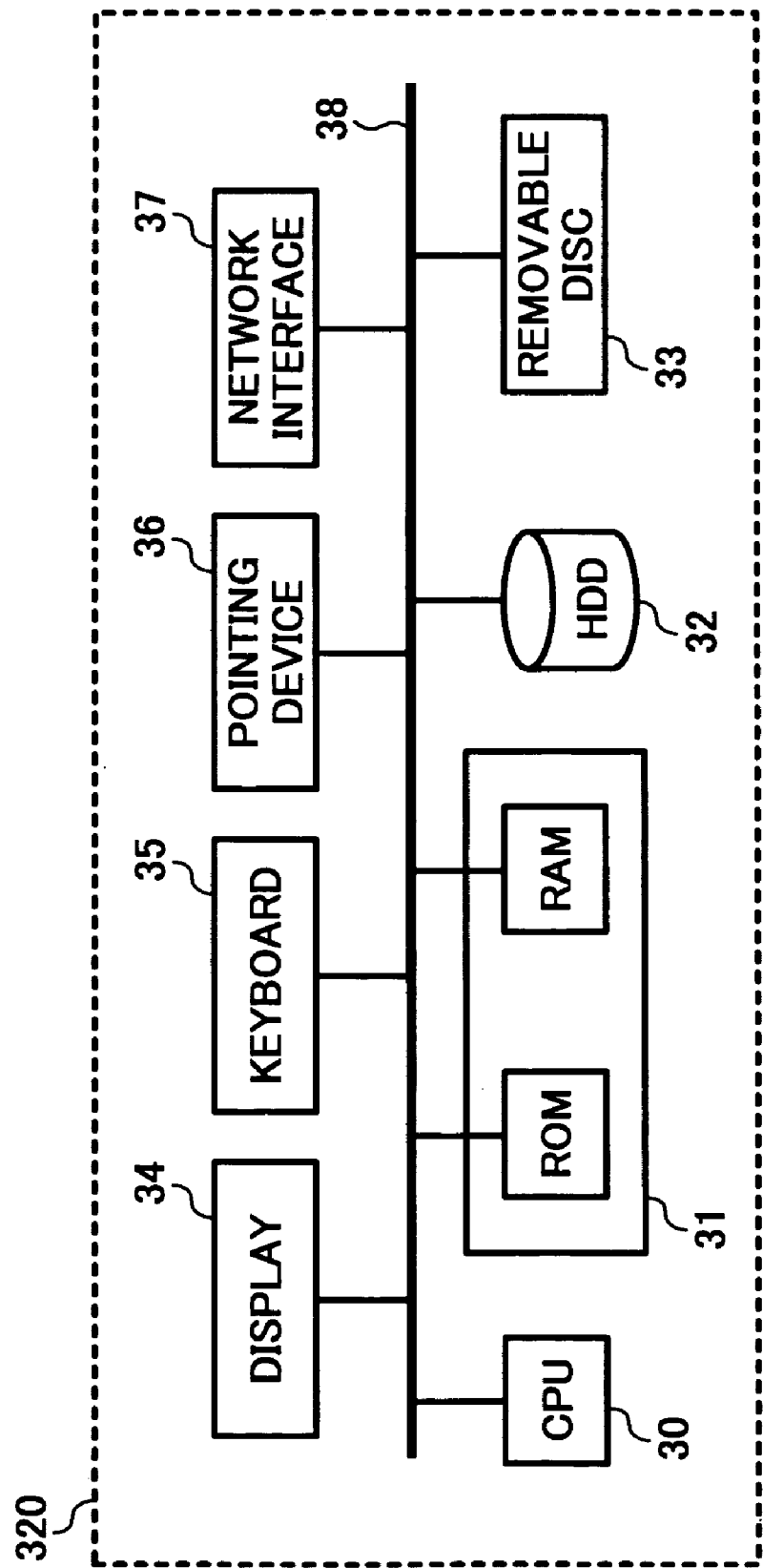
FIG. 13 is a schematic block diagram illustrating a personal computer shown in FIG. 12.

The PC 320 may be implemented by any kind of processor, as illustrated in FIG. 13, for example. Referring to FIG. 13, the PC 320 includes a CPU (central processing unit) 30, a memory 31 including a ROM and a RAM, a HDD (hard disk drive) 32, a removable disc device 33, a display 34, a keyboard 35, a pointing device 36, and a network interface 37, which are connected to one another via a bus 38.

In this exemplary embodiment, the PC 320 may operate as the main controller 108, by allowing a user to input an instruction through the keyboard 35 or the pointing device 36.

Further, in this exemplary embodiment, the PC 320 operates as the current state detector 112, the image processing selector 113, and the service call generator 114, or to perform at least one of the image processing operations described above referring to any one of FIGS. 2, 7, 9, and 10, according to one or more instructions stored in the memory 31 or the HDD 32.

Furthermore, any of the operations performed by the PC 320 may be stored in a recording medium removable from the PC 320. Examples of the removable recording medium include optical storage media such as CD-ROMs and DVDs, magneto-optical storage media such as MOs, magnetism storage media, etc.

Numerous additional modifications and variations are possible in light of the above teachings. It is therefore to be understood that within the scope of the appended claims, the disclosure of this patent specification may be practiced otherwise than as specifically described herein.

For example, elements and/or features of different illustrative embodiments may be combined with each other and/or substituted for each other within the scope of this disclosure and appended claims. Further, the order of the steps illustrated in any one of FIGS. 2, 7, 9, and 10 is not limited to the disclosure of this patent specification.

The invention claimed is:

1. An image forming apparatus, comprising:
   an image forming device configured to form an image;
   a detector configured to obtain current state information of the image forming device, the current state information indicating physical characteristics or image quality of the image;
   a storage device configured to store normal state information corresponding to the current state information;
   an image processor configured to apply one of 1) normal state image processing when no calibration operation is needed and 2) abnormal state image processing to be performed at least until the calibration operation is performed; and
   a controller configured to compare the current state information with the normal state information to generate a comparison result indicating a difference between the current state information and the normal state information, to detect a current state of the image forming apparatus based on the comparison result, and to select either the normal state image processing or the abnormal state image processing based on the detected current state, wherein
   when the normal state image processing is selected, the controller is further configured to select one of a plurality of normal state image operations based on the current state information to cause the image processor to apply the selected one of the normal state image operations, and
   when the abnormal state image processing is selected, the controller is further configured to cause the image processor to apply the abnormal state image processing, and
   wherein when the comparison result indicates that the overall intensity of one color of a plurality of colors obtained from the current state information is different from the overall intensity of the one color of the plurality of colors obtained from the normal state information, the image processor determines that the one color is in an abnormal state and is configured to:

extract a maximum output intensity for the one color in the abnormal state from the current state information;

extract intensity values for colors other than the one color that respectively correspond to the maximum output intensity from the normal state information;

scale intensity values of colors other than the one color that are obtained from the current state information such that the extracted intensity values for colors other than the one color are respectively set as the maximum intensity values of the scaled intensity values to generate adjusted intensity values; and apply image processing using the adjusted intensity values such that a color balance of the plurality of colors of the image to be formed by the image forming device is maintained even when the detected current state of the image forming apparatus is the abnormal state.

2. The image forming apparatus of claim 1, wherein the controller is configured to further generate a service call signal when the abnormal state image processing is selected at the time when the calibration operation is performed by the image processor without storing information regarding the selected abnormal state image processing in the storage device, and the controller is configured to store information regarding the selected one of the normal state image operations as history data in the storage device when the normal state image processing is selected and to determine whether to generate a service call signal based on the history data.

3. The image forming apparatus of claim 2, wherein the current state information includes a plurality types of information in addition to information obtained from the image, and the controller is configured to determine whether the detected current state of the image forming apparatus is the normal state or the abnormal state using an MTS method.

4. The image forming apparatus of claim 2, wherein the image forming device is configured to form a test pattern image, with the current state information being obtained from the test pattern image.

5. The image forming apparatus of claim 1, wherein when the comparison result indicates that a current graininess value obtained from the current state information falls outside a range set by a normal state graininess value obtained from the normal state information, the image processor is configured to change halftone processing so as to improve the graininess of the image to be formed by the image forming device even when the detected current state of the image forming apparatus is the abnormal state.

6. An image forming apparatus, comprising:

means for forming an image;

means for obtaining current state information of the image forming device, the current state information indicating physical characteristics or image quality of the image;

means for storing normal state information corresponding to the current state information;

means for applying one of 1) normal state image processing when no calibration operation is needed and 2) an abnormal state image processing to be performed at least until the calibration operation is performed;

means for comparing the current state information with the normal state information to generate a comparison result indicating a difference between the current state information and the normal state information;

means for detecting a current state of the image forming apparatus based on the comparison result;

means for selecting either the normal state image processing or the abnormal state image processing based on the detected current state, wherein when the normal state image processing is selected, the means for selecting is further configured to select one of a plurality of normal state image operations based on the current state information to cause the means for applying to apply the selected one of the normal state image operations, and when the abnormal state image processing is selected, the means for selecting is further configured to cause the means for applying to apply the abnormal state image processing, and wherein when the comparison result indicates that the overall intensity of at one color of a plurality of colors obtained from the current state information is different from the overall intensity of the one color of the plurality of colors obtained from the normal state information, the means for applying:

determining that the one color is in an abnormal state;

extracting a maximum output intensity for the one color in the abnormal state from the current state information;

extracting intensity values for colors other than the one color that respectively correspond to the maximum output intensity from the normal state information;

scaling intensity values of colors other than the one color that are obtained from the current state information such that the extracted intensity values for colors other than the one color are respectively set as the maximum intensity values of the scaled intensity values to generate adjusted intensity values; and applying image processing using the adjusted intensity values such that a color balance of the plurality of colors of the image to be formed by the image forming device is maintained even when the detected current state of the image forming apparatus is the abnormal state.

7. The image forming apparatus of claim 6, further comprising:

means for generating a service call signal when the abnormal state image processing is selected at the time when the calibration operation is performed by the means for applying without storing information regarding the selected abnormal state image processing in the storage device;

means for storing information regarding the selected one of the normal state image operations as history data when the normal state image processing is selected; and means for determining whether to generate a service call signal based on the history data.

8. An image forming system, comprising:

an image forming apparatus; and an information processing apparatus connected to the image forming apparatus through a network;

wherein the image forming apparatus includes:

an image forming device configured to form an image; and a detector configured to obtain current state information of the image forming device, the current state information indicating physical characteristics or image quality of the image; and an image processor configured to apply one of 1) normal state image processing when no calibration operation is needed and 2) an abnormal state image processing to be performed at least until the calibration operation is performed, wherein the information processing apparatus includes:

a controller configured to compare the current state information with normal state information corresponding to the current state information to generate a comparison result indicating a difference between the current state information and the normal state information, to detect a current state of the image forming apparatus based on the comparison result, and to select either the normal state image processing or the abnormal state image processing based on the detected current state, wherein when the normal state image processing is selected, the controller is further configured to select one of a plurality of normal state image operations based on the current state information to cause the image processor of the image forming apparatus to apply the selected one of the normal state image operations, and when the abnormal state image processing is selected, the controller is further configured to cause the image processor of the image forming apparatus to apply the abnormal state image processing, and wherein when the comparison result indicates that the overall intensity of one color of a plurality of colors obtained from the current state information is different from the overall intensity of the one color of the plurality of colors obtained from the normal state information, the image processor is configured to determine that the one color is in an abnormal state; and extract a maximum output intensity for the one color in the abnormal state from the current state information;

extract intensity values for colors other than the one color that respectively correspond to the maximum output intensity from the normal state information;

scale intensity values of colors other than the one color that are obtained from the current state information such that the extracted intensity values for colors other than the one color are respectively set as the maximum intensity values of the scaled intensity values to generate adjusted intensity values; and apply image processing using the adjusted intensity values such that a color balance of the plurality of colors of the image to be formed by the image forming device is maintained even when the detected current state of the image forming apparatus is the abnormal state.

9. The system of claim 8, wherein when the comparison result indicates that a current graininess value obtained from the current state information falls outside a range set by a normal state graininess value obtained from the normal state information, the controller of the information processing apparatus causes the image processor of the information processing apparatus to change halftone processing so as to improve the graininess of the image to be formed by the image forming device even when the detected current state of the image forming apparatus is the abnormal state.

10. The system of claim 8, wherein the controller of the information processing apparatus is configured to further generate a service call signal when the abnormal state image processing is selected at the time when the calibration operation is performed by the image processor of the image forming apparatus without storing information regarding the selected abnormal state image processing in the storage device, and the controller of the information processing apparatus is configured to store information regarding the selected normal state image processing as history data in the storage device when the normal state image processing is selected and to determine whether to generate a service call signal based on the history data.

11. The system of claim 8, wherein the current state information includes a plurality types of information in addition to information obtained from the image, and the controller is configured to determine whether the detected current state of the image forming apparatus is the normal state or the abnormal state using an MTS method.

12. An image forming method, comprising:

forming an image using an image forming device;

obtaining current state information of the image forming device, the current state information indicating physical characteristics or image quality of the image;

storing normal state information corresponding to the current state information in a storage device;

providing an image processor to apply one of 1) normal state image processing when no calibration operation is needed and 2) an abnormal state image processing to be performed at least until the calibration operation is performed;

comparing the current state information with the normal state information to generate a comparison result indicating a difference between the current state information and the normal state information;

detecting a current state of the image forming apparatus based on the comparison result;

selecting either the normal state image processing or the abnormal state image processing based on the detected current state, wherein when the normal state image processing is selected, the selecting comprises selecting one of a plurality of normal state image operations based on the current state information to cause the image processor to apply the selected one of the normal state image operations, and when the abnormal state image processing is selected, the selecting comprises the image processor to apply the abnormal state image processing, and wherein when the comparison result indicates that the overall intensity of one color of a plurality of colors obtained from the current state information is different from the overall intensity of the one color of the plurality of colors obtained from the normal state information, the image processor performs:

determining that the one color is in an abnormal state;

extracting a maximum output intensity for the one color in the abnormal state from the current state information;

extracting intensity values for colors other than the one color that respectively correspond to the maximum output intensity from the normal state information;

scaling intensity values of colors other than the one color that are obtained from the current state information such that the extracted intensity values for colors other than the one color are respectively set as the maximum intensity values of the scaled intensity values to generate adjusted intensity values; and applying image processing using the adjusted intensity values such that a color balance of the plurality of colors of the image to be formed by the image forming device is maintained even when the detected current state of the image forming apparatus is the abnormal state.

13. The method of claim 12, wherein when the comparison result indicates that a current graininess value obtained from the current state information falls outside a range set by a normal state graininess value obtained from the normal state information, the selected abnormal image processing comprises:

changing halftone processing so as to improve the graininess of the image to be formed by the image forming device even when the detected current state of the image forming apparatus is the abnormal state.

14. The method of claim 12, further comprising:

generating a service call signal when the abnormal state image processing is selected at the time when the calibration operation is performed by the image processor without storing information regarding the selected abnormal state image processing in the storage device; and storing information regarding the selected one of the normal state image operations as history data in the storage device when the normal state image processing is selected.

15. A computer readable recording medium including computer program instructions which cause a computer to execute a method of image forming, the method comprising:

forming an image using an image forming device;

obtaining current state information of the image forming device, the current state information indicating physical characteristics or image quality of the image;

storing normal state information corresponding to the current state information in a storage device;

providing an image processor to apply one of 1) normal state image processing when no calibration operation is needed and 2) an abnormal state image processing to be performed at least until the calibration operation is performed;

comparing the current state information with the normal state information to generate a comparison result indicating a difference between the current state information and the normal state information;

detecting a current state of the image forming apparatus based on the comparison result;

selecting either the normal state image processing or the abnormal state image processing based on the detected current state, wherein when the normal state image processing is selected, the selecting comprises selecting one of a plurality of normal state image operations based on the current state information to cause the image processor to apply the selected one of the normal state image operations, and when the abnormal state image processing is selected, the selecting comprises the image processor to apply the abnormal state image processing, and wherein when the comparison result indicates that the overall intensity of one color of a plurality of colors obtained from the current state information is different from the overall intensity of the one color of the plurality of colors obtained from the normal state information, the image processor performs:

determining that the one color is in an abnormal state;

extracting a maximum output intensity for the one color in the abnormal state from the current state information;

extracting intensity values for colors other than the one color that respectively correspond to the maximum output intensity from the normal state information;

scaling intensity values of colors other than the one color that are obtained from the current state information such that the extracted intensity values for colors other than the one color are respectively set as the maximum intensity values of the scaled intensity values to generate adjusted intensity values; and applying image processing using the adjusted intensity values such that a color balance of the plurality of colors of the image to be formed by the image forming device is maintained even when the detected current state of the image forming apparatus is the abnormal state.

* * * * *